United States Patent
Pascoe

(10) Patent No.: US 6,769,525 B2
(45) Date of Patent: Aug. 3, 2004

(54) CLUTCH ASSEMBLY HAVING A MULTI-PIECE CLUTCH RING

(75) Inventor: David Mark Pascoe, Newmarket (CA)

(73) Assignee: Tesma International Inc., Concord (CA)

(*) Notice: Subject to any disclaimer, the term of this patent is extended or adjusted under 35 U.S.C. 154(b) by 0 days.

(21) Appl. No.: 10/199,338

(22) Filed: Jul. 19, 2002

(65) Prior Publication Data

US 2003/0029686 A1 Feb. 13, 2003

Related U.S. Application Data

(60) Provisional application No. 60/306,961, filed on Jul. 19, 2001.

(51) Int. Cl.[7] .............................................. F16D 41/06
(52) U.S. Cl. ........................................ 192/45; 192/112
(58) Field of Search .............................. 192/45, 110 B, 192/112

(56) References Cited

U.S. PATENT DOCUMENTS

| | | | | |
|---|---|---|---|---|
| 3,055,471 A | * | 9/1962 | Warn et al. | 192/45 |
| 3,512,856 A | * | 5/1970 | Robinson | 384/535 |
| 4,660,698 A | * | 4/1987 | Miura | 192/45 |
| 4,989,705 A | * | 2/1991 | Kashio et al. | 192/45 |
| 6,257,385 B1 | * | 7/2001 | Ouchi | 192/45 |

* cited by examiner

Primary Examiner—Saúl J. Rodríguez
(74) Attorney, Agent, or Firm—Clark Hill PLC

(57) ABSTRACT

A clutch assembly includes an outer ring having an inner peripheral surface and an inner ring seated within the outer ring and having an outer peripheral surface. A plurality of rollers is seated between the inner and outer rings for selectively binding between the inner and outer peripheral surfaces to prevent rotation of the inner disc relative to the outer disc. At least one of the inner and outer disc includes an inner sleeve mechanically coupled to an outer jacket with an interference fit such that the inner sleeve is in compression and the outer jacket is in tension whereby the tensile hoop stress is reduced between the inner and outer rings upon the binding of the rollers between the surfaces.

14 Claims, 5 Drawing Sheets

CLUTCH ASSEMBLY HAVING A MULTI-PIECE CLUTCH RING

This application claims the benefit of Provisional application No. 60/306,961 filed Jul. 19, 2001.

FIELD OF THE INVENTION

The invention relates to a clutch assembly. More particularly, the invention relates to a clutch assembly having a multi-piece inner or outer clutch ring.

DESCRIPTION OF THE RELATED ART

One-way or bi-directional roller type clutches typically include a cylindrical inner ring seated within a larger cylindrical outer ring. The outer peripheral surface of the inner ring commonly includes cam surfaces wherein a plurality of rollers is seated along the cam surfaces between the outer peripheral surface of the inner ring and the inner peripheral surface of the outer ring. These clutches may also include biasing springs for biasing the roller along the cam surfaces. When the clutch is unlocked, it allows rotation of the inner ring relative to the outer ring. Conversely, when the clutch is locked, it prevents rotation of the inner ring relative to the outer ring by the binding action of the rollers moved along the cam surfaces between the inner and outer rings.

When the clutch is locked by the rotation and torquing action of the inner ring with respect to the outer ring, the outward force of the rollers puts the outer ring into tension. The tensile hoop stress on the outer ring is at a maximum its inner peripheral surface and decreases towards the outer peripheral surface. The clutch torque limit is typically due to the limit of hertz stresses and hoop stress between the rings. Typically, the hertz stress is highest between the roller or spragues and the race or cam surfaces. This torque limit, or capacity, is a function of race diameter, roller diameter, roller length, number of rollers, material selection, heat treatment, and other factors. Further, the failure mode for excessive hoop stress is typically in the outer clutch ring where there is also tensile hoop stress. It is less common, but still possible, to have compression hoop stress failures in the inner clutch ring or shaft. The hoop strength of a clutch is also typically a function of inner and outer ring diameter, thickness, material selection, heat treatment, and other factors.

Prior art one way and bi-directional roller clutches, sprague clutches, strut clutches, and the like, are made of isotropic material and each of the inner and outer rings is made as a single part.

It is desirable to provide inner and outer clutch rings with higher hoop strengths, such that the clutch capacity will be less limited by the hoop strength of the rings.

SUMMARY OF THE INVENTION

According to one aspect of the invention, a clutch assembly includes an outer ring having an inner peripheral surface. An inner ring is seated within the outer ring and has an outer peripheral surface. A plurality of rollers is seated between the inner and outer peripheral surfaces for selectively binding the inner and outer rings and preventing relative movement between the inner and outer rings. At least one of the inner and outer rings includes an inner sleeve mechanically coupled to an outer jacket with an interference fit such that the inner sleeve is in compression and the outer jacket is in tension, whereby the tensile hoop stress is reduced between the inner and outer rings upon the binding of the rollers between the inner and outer peripheral surfaces.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
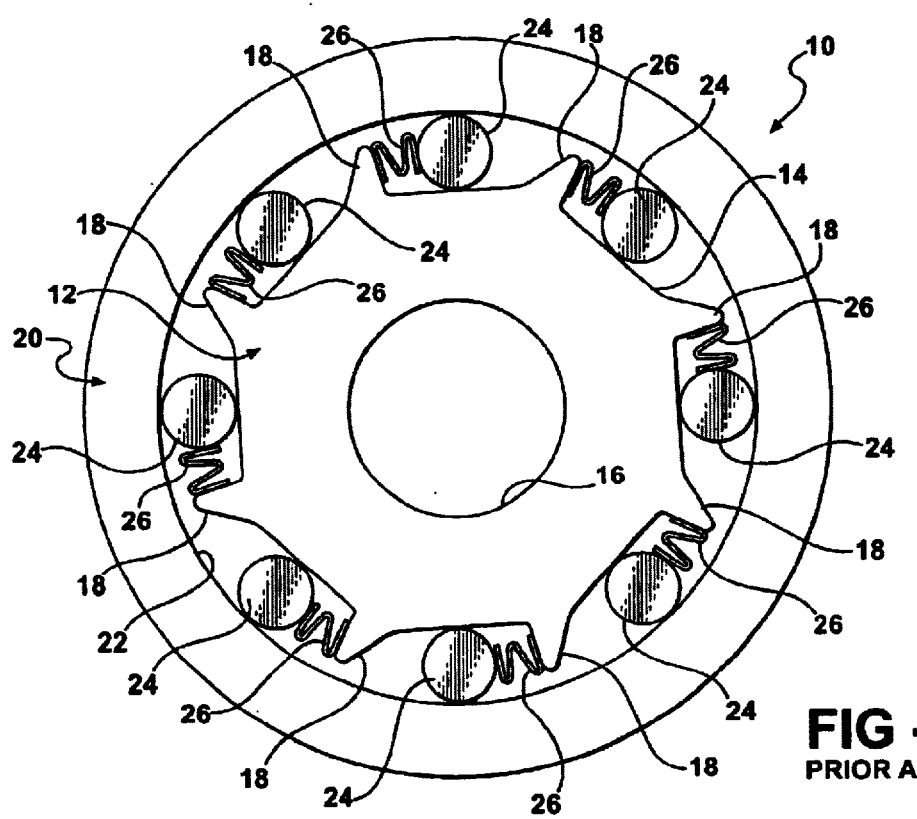
FIG. 1 is a plan view of a conventional clutch assembly.

A one-way clutch of the prior art is generally shown at 10 in FIG. 1. The clutch 10 includes a generally cylindrical or disc-shaped inner ring 12 having a plurality of outer peripheral cam surfaces 14 and a center bore 16 for fixedly receiving a drive shaft therethrough. A plurality of cam lobes 18 extends generally radially outwardly from between the plurality of outer peripheral cam surfaces 14. The inner ring 12 is concentrically seated in a generally cylindrical or disc-shaped outer ring 20 having an inner peripheral surface 22. A plurality of rollers 24 is seated between the outer peripheral cam surfaces 14 of the inner ring 12 and the inner peripheral surface 22 of the outer ring 20. A biasing spring 26 is disposed between each cam lobe 18 and a roller 24 adjacent each cam lobe 18. In operation, when the inner ring 12 is rotated in the clockwise direction, as viewed in FIG. 1, the rollers 24 are retained adjacent the cam lobes 18 allowing the inner ring 12 to rotate relative to the outer ring 20. When the inner ring 12 is rotated in the counterclockwise direction, the rollers 24 roll along the outer peripheral cam surfaces 14 into binding engagement between the inner peripheral surface 22 of the outer ring 20 and the outer peripheral cam surfaces 14 to prevent relative rotation between the inner and outer rings 12, 20. When the clutch 10 is locked in this position, continued torque applied upon the inner ring 12 in the counterclockwise direction forces the rollers 24 outwardly against the inner peripheral surface 22, and thereby, tensions the outer ring 20. This tension or tensile hoop stress on the outer ring 20 is at a maximum on the inner peripheral surface 22.

Figure 2:
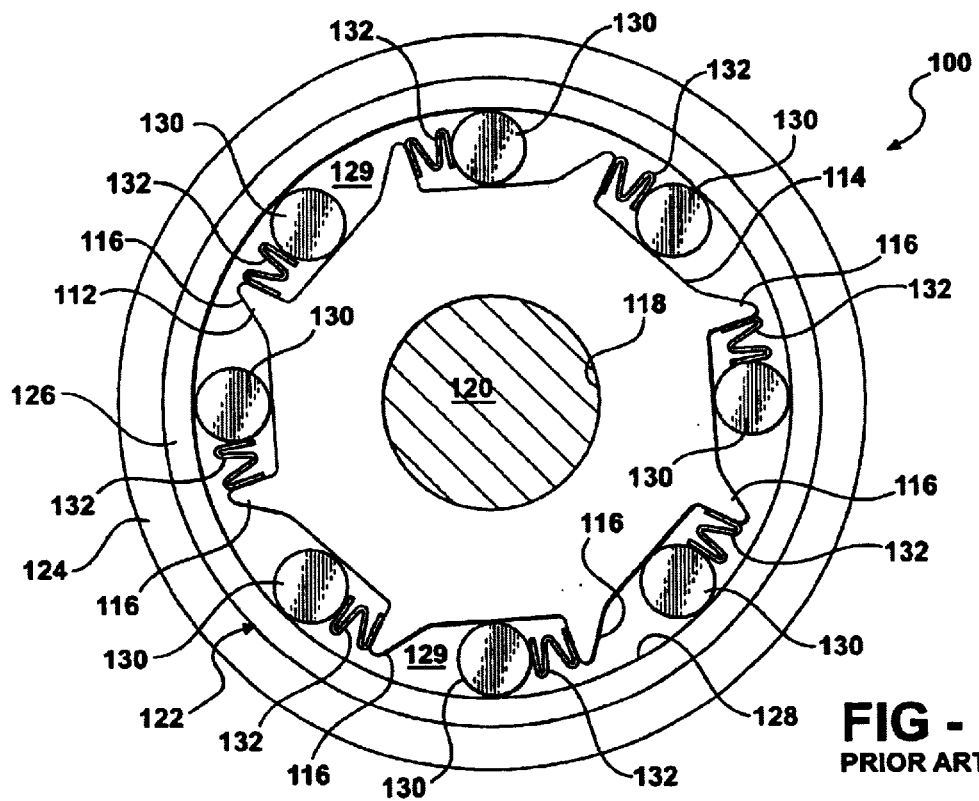
FIG. 2 is a plan view of one embodiment of the invention.
Figure 3:
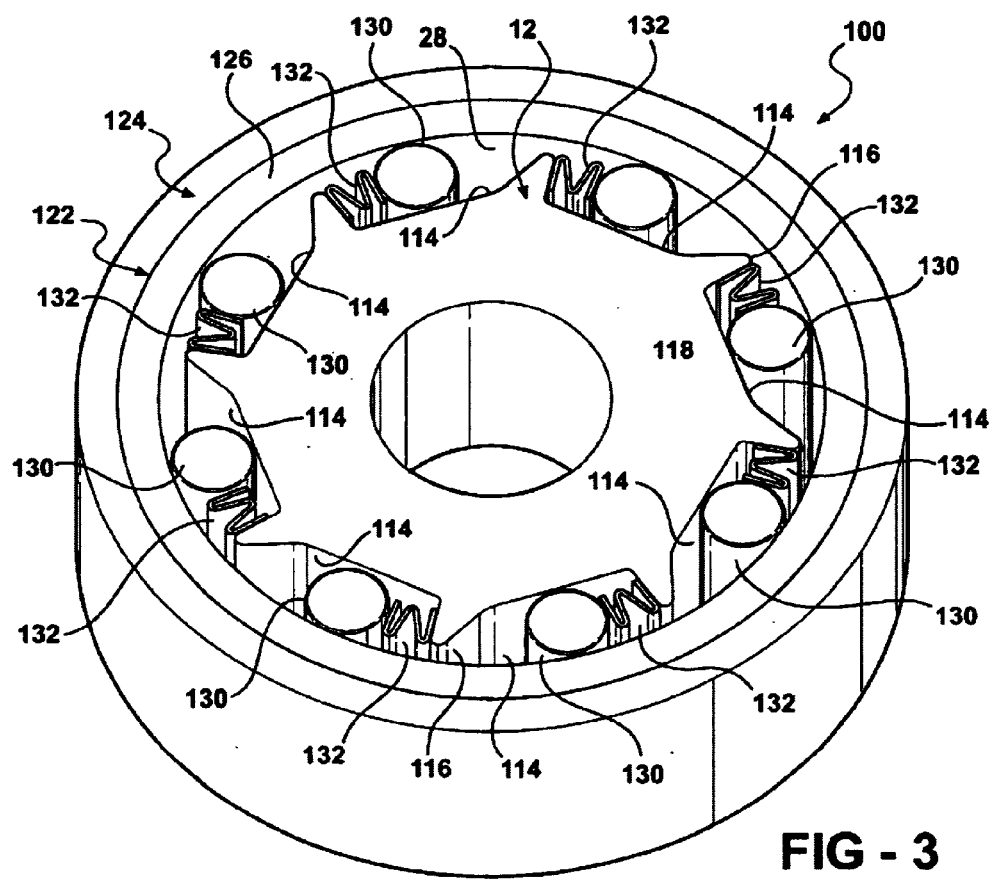
FIG. 3 is a perspective view of one embodiment of the invention.

Referring to FIGS. 2 and 3, a clutch assembly 100 according to one aspect of the invention is shown. The clutch assembly 100 includes a generally cylindrical or disc-shaped inner ring 112. The inner ring 112 includes a plurality of outer peripheral cam surfaces 114. A plurality of cam lobes 116 extends generally radially outwardly from between the plurality of outer peripheral cam surfaces 114 and define an outer diameter for the inner ring 112. A center bore 118 is formed in the inner ring 112 for receiving a drive shaft 120 therethrough. The inner ring 112 is fixedly secured to the drive shaft 120.

The clutch assembly 100 also includes an outer ring 122. The outer ring 122 includes a generally ring shaped outer jacket 124 and a ring shaped inner sleeve 126 seated concentrically within the outer jacket 124. The outer jacket 124 and inner sleeve 126 are interference or press fit together such that the outer jacket 124 is in tension and the inner sleeve 126 is in hoop compression when the clutch assembly 100 is unloaded. The inner sleeve 126 has an inner peripheral surface 128 that defines an inner diameter for the outer ring 122 that is greater than the outer diameter of the inner ring 112. Therefore, a space 129 is defined between the inner peripheral surface 128 of the outer ring 122 and the outer peripheral cam surface 114 of the inner ring 112. The inner ring 112 is seated generally concentrically between the inner peripheral surface 128 of the inner sleeve 126.

A plurality of rollers 130 is seated between the cam surfaces 114 of the inner ring 112 and inner peripheral surface 128 of the inner sleeve 126. A biasing spring 132 is disposed between each cam lobe 116 and a roller 130 adjacent each cam lobe 116.

In operation, the inner sleeve 126 is preloaded in hoop compression by the outer jacket 124 when the clutch assembly 110 is in the unloaded state. When the inner ring 112 is rotated in the counterclockwise direction, the rollers 130 move into binding engagement between the inner peripheral surface 128 and the outer peripheral cam surfaces 114 to prevent relative rotation between the inner and outer rings 112, 122. Continued torque applied upon the inner ring 112 in the counterclockwise direction tensions the outer ring 122 as the rollers 130 are forced outwardly by the outer peripheral cam surfaces 114 against the inner peripheral surface 128. The preloading of the inner sleeve 126 allows a higher torque to be placed on the clutch assembly 110 than on the conventional clutch 10 before the inner peripheral surface 128 of the inner sleeve 126 reaches its tensile hoop stress limit.

Figure 4A:
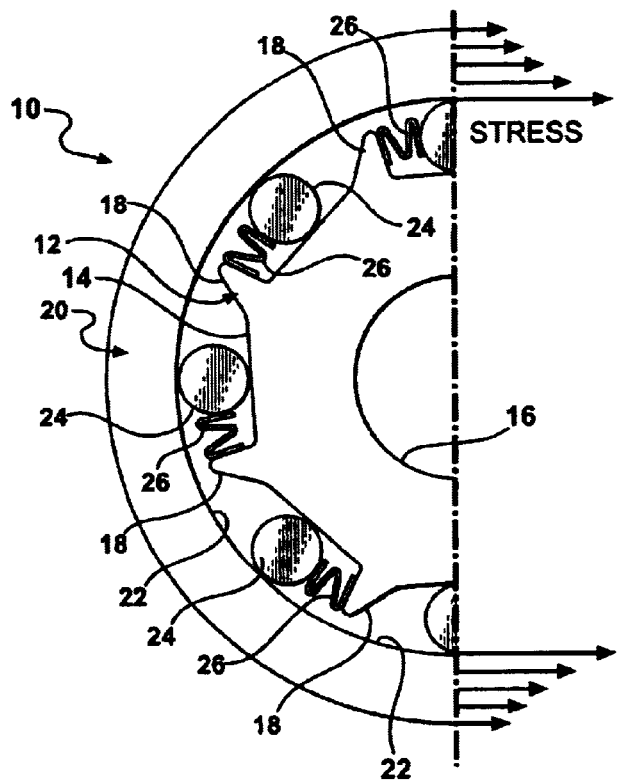
FIG. 4a is a typical hoop stress distribution through a cross section of the conventional clutch assembly.
Figure 4B:
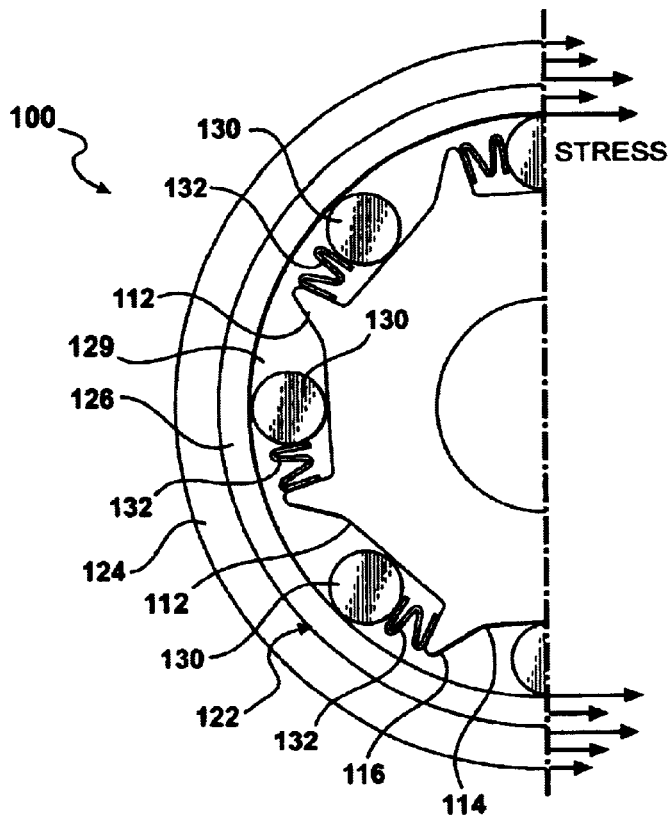
FIG. 4b is a hoop stress distribution through a cross section of one embodiment of the invention.

FIG. 4a shows a typical hoop stress distribution through a cross section of the conventional clutch 10, shown in FIG. 1, when torque is applied thereto. FIG. 4b shows the hoop stress distribution through a cross section of the clutch assembly 100, shown in FIGS. 2 and 3, when a similar torque is applied to the clutch assembly 100. The peak stress is significantly higher in the conventional clutch 10, as shown in FIG. 4a, than in the clutch assembly 100, as shown in FIG. 4b. More specifically, the peak stress is reduced in the clutch assembly 100 because the torque applied on the clutch assembly 100 must first overcome or relieve the hoop compression due to the preloading applied by the outer jacket 124 upon the inner sleeve 126 prior to reaching a tensile load condition.

The inner sleeve 126 and the outer jacket 124 may be made to achieve the peak design stress at the same time by tuning the interference or press fit between the inner sleeve 126 and the outer jacket 124.

Figure 5:
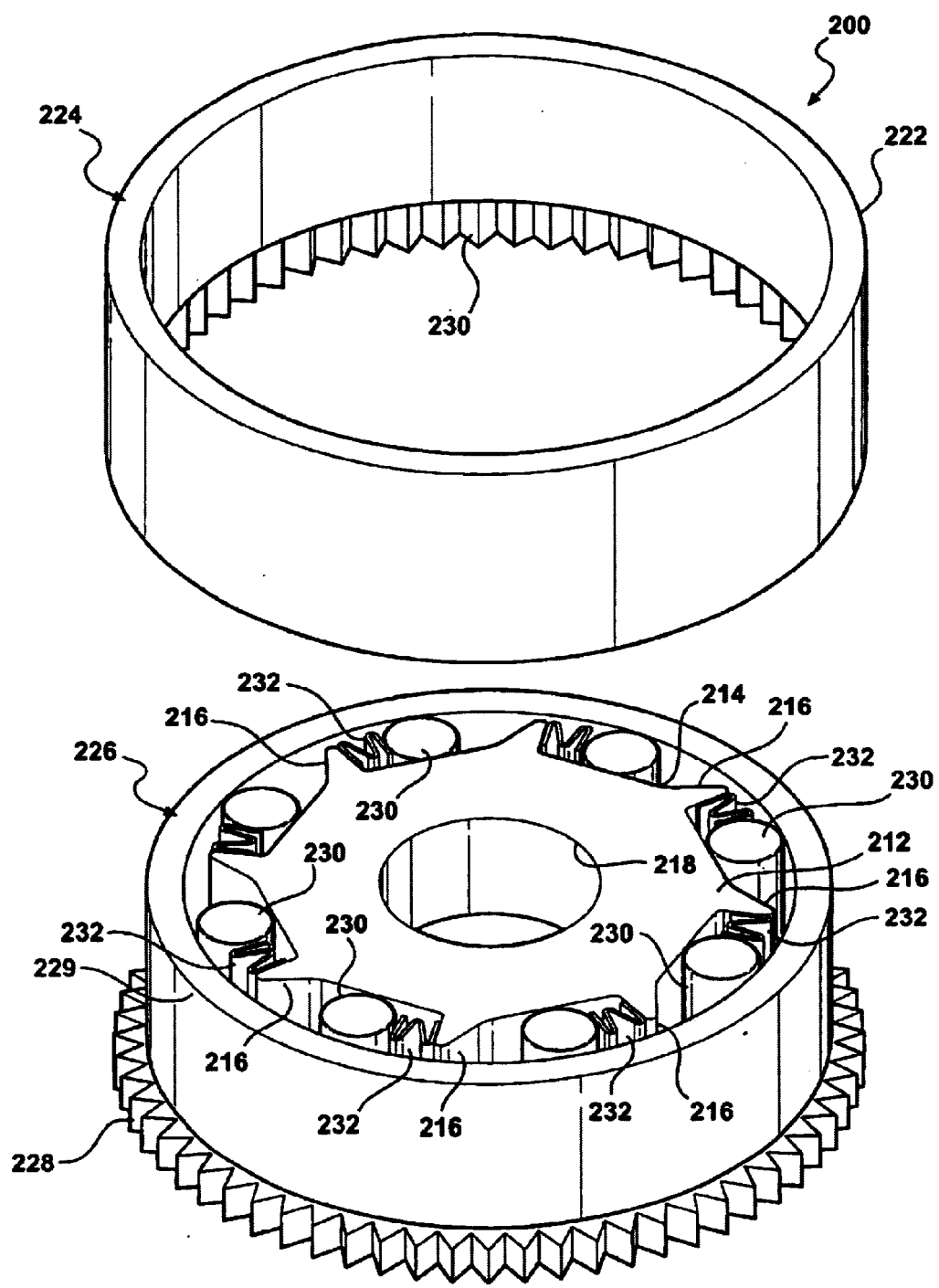
FIG. 5 is a partially exploded, perspective view of an second embodiment of the invention.

Referring to FIG. 5, an alternative embodiment is shown wherein like elements are offset by one hundred from those of the first embodiment 100. The outer ring 222 is formed by a mechanically splined inner sleeve 226 and outer jacket 224. The inner sleeve 226 includes a rack of gear teeth 228 projecting from at least a portion of its outer peripheral surface 229 for meshing, and mechanical or rotation locking engagement, with a corresponding rack of gear teeth 230 on at least a portion of the inner peripheral surface of the outer jacket 224. It should be appreciated that many other mechanical joints can be used to achieve the coupling between the inner sleeve 226 and outer jacket 224.

Figure 6:
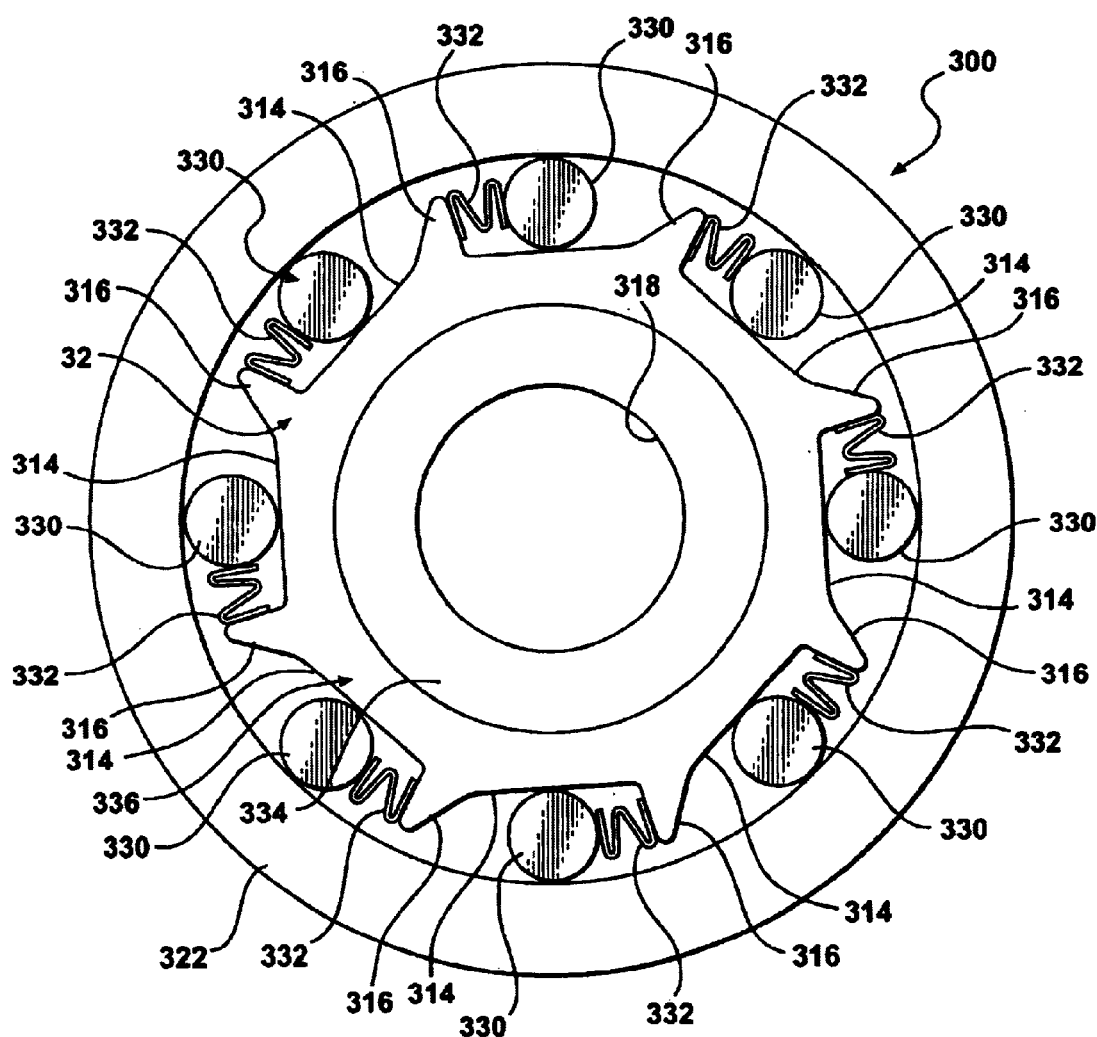
FIG. 6 is a plan view of a third embodiment of the invention.

Referring to FIG. 6, yet another alternative embodiment is shown wherein like elements are offset by an additional one hundred. The inner ring 312 is formed by an inner portion 334 and an outer portion 336. Similar to the embodiment of FIGS. 2 and 3, the inner portion 334 may be press fit with an interference or press fit to the outer portion 336 or coupled with a mechanical joint to reduce the maximum compressive hoop stress on the inner ring in an analogous manner to that described hereinabove for the outer ring 222 of the second embodiment.

Finally, it should be appreciated that the invention may be applied to either or both the inner or outer ring of the clutch assembly. That is, the inner and/or outer rings may be formed by press fit, laminated, or mechanically joined, inner and outer portions to reduce the maximum compressive hoop stress on the rings. It should also be appreciated that the inner and outer rings may be formed by two, three or more portions that are press fit, laminated or mechanically joined to further increase the hoop strength performance of the clutch.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A clutch assembly comprising:

an inner ring having an inner bore and a continuous outer periphery defining a plurality of outer peripheral cam surfaces;

an outer ring having an inner peripheral surface;

a plurality of rollers seated between said inner and outer peripheral surfaces for selectively binding said inner and outer rings and preventing relative movement therebetween; and said outer ring including an outer jacket and an inner sleeve defining said inner peripheral surface, said outer jacket and said inner sleeve being mechanically coupled wherein tensile hoop stress in said outer ring is reduced by said outer jacket being mechanically coupled with said inner sleeve.

2. A clutch assembly as set forth in claim 1 wherein said inner ring is seated concentrically within said inner peripheral surface of said inner sleeve.

3. A clutch assembly as set forth in claim 2 wherein each of said plurality of outer peripheral cam surfaces receive one of said plurality of rollers to selectively force said plurality of rollers into engagement with said outer ring to prevent relative movement between said inner and outer rings.

4. A clutch assembly as set forth in claim 3 wherein said inner ring includes a plurality of cam lobes extending outwardly between each of said plurality of outer peripheral cam surfaces for spacing each of said plurality of rollers such that each of said plurality of rollers rolls along one of said plurality of outer peripheral cam surfaces.

5. A clutch assembly as set forth in claim 4 including a plurality of biasing springs disposed between each of said plurality of cam lobes and each of said plurality of rollers for biasing said plurality of rollers away from said plurality of cam lobes.

6. A clutch assembly as set forth in claim 1 wherein said inner sleeve is mechanically coupled to said outer jacket with an interference fit such that said inner sleeve is in compression and said outer jacket is in tension whereby the tensile hoop stress is reduced between said inner and outer rings upon said binding of said rollers between said inner and outer peripheral surfaces.

7. A clutch assembly as set forth in claim 1 wherein said inner sleeve includes an outer peripheral surface having a rack of gear teeth and said inner peripheral surface of said outer jacket includes a corresponding rack of gear teeth in meshed locking engagement with the rack of gear teeth of said inner sleeve to provide said mechanical coupling between said inner sleeve and said outer jacket.

8. A clutch assembly comprising:

an inner ring having an inner bore and a continuous outer periphery defining a plurality of outer peripheral cam surfaces;

an outer ring having an inner peripheral surface;

a plurality of rollers seated between said inner and outer peripheral surfaces for selectively binding said inner and outer rings and preventing relative movement therebetween; and said inner ring including an inner sleeve and an outer jacket defining said outer periphery, said inner sleeve and said outer jacket being mechanically coupled wherein tensile hoop stress in said inner ring is reduced by said outer jacket being mechanically coupled with said inner sleeve.

9. A clutch assembly as set forth in claim 8 wherein said outer jacket of said inner ring is seated concentrically within said inner peripheral surface of said outer ring.

10. A clutch assembly as set forth in claim 9 wherein each of said plurality of outer peripheral cam surfaces receive one of said plurality of rollers to selectively force said plurality of rollers into engagement with said outer ring to prevent relative movement between said inner and outer rings.

11. A clutch assembly as set forth in claim 10 wherein said inner ring includes a plurality of cam lobes extending outwardly between each of said plurality of outer peripheral cam surfaces for spacing each of said plurality of rollers such that each of said plurality of rollers rolls along one of said plurality of outer peripheral cam surfaces.

12. A clutch assembly as set forth in claim 11 including a plurality of biasing springs disposed between each of said plurality of cam lobes and each of said plurality of rollers for biasing said plurality of rollers away from said plurality of cam lobes.

13. A clutch assembly as set forth in claim 8 wherein said inner sleeve is mechanically coupled to said outer jacket with an interference fit such that said inner sleeve is in compression and said outer jacket is in tension whereby the tensile hoop stress is reduced between said inner and outer rings upon said binding of said rollers between said inner and outer peripheral surfaces.

14. A clutch assembly as set forth in claim 8 wherein said inner sleeve includes an outer peripheral surface having a rack of gear teeth and said outer jacket includes an inner peripheral surface having a corresponding rack of gear teeth in meshed locking engagement with the rack of gear teeth of said inner sleeve to provide said mechanical coupling between said inner sleeve and said outer jacket.

* * * * *